United States Patent [19]
Schoeberl

[11] Patent Number: 5,439,576
[45] Date of Patent: Aug. 8, 1995

[54] APPARATUS FOR THE STERILIZATION OF WATER

[76] Inventor: Meinolf Schoeberl, Geigelsteinstrasse 8, Prien D-8210, Germany

[21] Appl. No.: 920,510
[22] PCT Filed: Dec. 19, 1991
[86] PCT No.: PCT/EP91/02459
§ 371 Date: Oct. 1, 1992
§ 102(e) Date: Oct. 1, 1992
[87] PCT Pub. No.: WO92/11209
PCT Pub. Date: Jul. 9, 1992

[30] Foreign Application Priority Data

Dec. 19, 1990 [DE] Germany .......... 40 40 694.6

[51] Int. Cl.⁶ .................................. C02F 1/461
[52] U.S. Cl. .................................. 204/263; 204/269; 204/272; 204/275; 204/290 R; 204/290 F
[58] Field of Search .......... 204/269, 272, 275, 290 R, 204/290 F, 149, 263

[56] References Cited

U.S. PATENT DOCUMENTS

| | | | |
|---|---|---|---|
| 3,305,472 | 2/1967 | Oldershaw | 204/268 |
| 4,202,738 | 5/1980 | Stillman | 204/95 |
| 4,519,889 | 5/1985 | Pellegri et al. | 204/275 |
| 4,761,208 | 8/1988 | Gram et al. | 204/95 |
| 4,997,540 | 3/1991 | Howlett | 204/271 |
| 5,062,940 | 11/1991 | Davies | 204/228 |
| 5,094,734 | 3/1992 | Torrado | 204/234 |
| 5,108,563 | 4/1992 | Cook | 204/149 |

FOREIGN PATENT DOCUMENTS

| | | |
|---|---|---|
| 0322478 | 7/1989 | European Pat. Off. . |
| 2644155 | 12/1990 | France . |
| 2176497 | 12/1986 | United Kingdom . |
| WO85/01965 | 5/1985 | WIPO . |

*Primary Examiner*—John Niebling
*Assistant Examiner*—Arun Phasge
*Attorney, Agent, or Firm*—Townsend and Townsend Khourie and Crew

[57] ABSTRACT

An apparatus for sterilizing water by anodic oxidation. A reactor contains a plurality of anodes (3) and cathodes (4) arranged as parallel plates within the reactor. The anodes and cathodes are arranged in series within four modules (2). Each module includes two draw bolts (34, 44) extending through bores in the anodes and cathodes and threadably engaged to contact bolts (7) on either side of the module. The contact bolts provide high surface pressure to the anodes and cathodes so that high electrical currents can be conducted through the reactor. The anodes each consist of materials that provide a greater overvoltage with respect to oxygen generation than with respect to chlorine generation. Thus, the reactor can produce a sufficient quantity of oxidants to sterilize the water without adding chlorine compounds to the water.

3 Claims, 6 Drawing Sheets

APPARATUS FOR THE STERILIZATION OF WATER

BACKGROUND OF THE INVENTION

The invention relates to an apparatus for the sterilization of water by means of anodic oxidation comprising a reactor through which water flows and which has at least one anode and one cathode and also a power supply means.

Apparatus of this kind is for example known from DE-OS 2757 854. There the anodes and cathodes are formed by bars which are arranged in a grid-like manner and extend transversely through the reactor. The bars of the anode and of the cathode are respectively electrically combined with one another by a connection element which is connected in each case to the power supply. Between the bar grid of the anode and the bar grid of the cathode there are arranged a plurality of subsidiary electrode bar grids which extend parallel to the bars of the anode and the bars of the cathode. In this arrangement bar grid planes which lie behind one another in the flow direction are displaced in such a way that one bar of a subsequent bar grid plane is laterally displaced approximately into the centre of the spacing between two bars of a preceding bar grid plane.

This arrangement of electrodes or subsidiary electrodes is intended to ensure that the liquid passes through a region of changing potentials with turbulence.

A reactor is known from DE-PS 28 61 889 in which the electrodes are formed as bar or grid-like individual elements and through which water flows in cross-flow. In this manner, a turbulent flow is obtained in the reactor to improve of the convective material exchange at the electrode-phase boundary.

These known devices bring about considerable generation of electrolysis gases in addition to sterilization and these electrolysis gases adhere to the electrode surfaces and are intended to be carried away by the eddying of the flow.

SUMMARY OF THE INVENTION

It is the object of the present invention to devise an apparatus of the initially named kind in such a way that a reliable sterilizing effect is obtained with a longer life time of the electrodes and with a simultaneous reduction in the formation of undesired gas bubbles and side reactions in the reactor.

This object is satisfied in the apparatus of the invention, in that a gap of constant gap width is provided between the mutually confronting surfaces of the anode and cathode. The gap width is dimensioned such that a pronounced and preferably laminar flow forms between the mutually confronting surfaces of the anode and cathode in the water flowing through the gap. The and in that the anode consists of a material which has an anode overpotential greater with respect to the generation of oxygen than with respect to the generation of chlorine from chloride ions.

The constant gap width over the surface of the electrodes which lie opposite to one another thereby ensures the laminar flow and thus the formation of an essentially homogenous electrical field between the electrodes.

As a result of the laminar flow between the mutually confronting surfaces of the anode and cathode, it is ensured that even with only low concentrations of dissolved chloride ions in the water, the chloride ions are transported by means of electrostatic migration in the homogenous potential field uniformly to the anode boundary layer without being hindered in their migratory movement by turbulent flow vectors. At the same time it is ensured, through the choice of the anode material in accordance with the invention, that the undesired generation of molecular oxygen (and thus the undesired gas bubble formation on the electrode surfaces) is reduced with respect to the generation of chloroxy acids, their salts and other oxidants which can be determined as chlorine equivalents (such as for example all oxidants which can be detected with DPD (Diethyl-p-phenylidene diamine, predominantly HOCl and OCl).

The core of the anode consists of a valve metal, such as for example titanium, niobium or tantalum ensuring that it forms a protective stable oxide layer in the electrolyte. Thus no corrosion of the anode core arises in regions in which the coating of the anode core has gaps. The efficacy of such an anode is improved because a plurality of layer pairs are provided which are alternately deposited. Through the special smooth surface of the anode, the long-term constancy of the anode activity is increased—in contrast to customary electrolysis—because the entire active surface of the anode is not blocked by layers of adsorbate as a result of the low surface roughness.

The modular construction of the apparatus increases the economy of manufacture and servicing of the apparatus. Moreover, it is in this way made possible for a plurality of electrode modules to be connected together as an electrical series circuit. In this manner, a considerable enlargement of the active reactor volume and of the anode surface is possible, while retaining the preset potential and respectively pervading between the anode and the cathode, without the current which flows through the reactor increasing in total. As result of the series circuit of the modules, the necessary electrical power increase is obtained via an increase of the potential applied to the reactor as a whole.

The contacting of the electrodes extensively prevents resistive polarisation as a result of the high surface pressure between the boundary surfaces of the electrodes and the spacer elements. Thus, the electro-chemical corrosion at the boundary surfaces is almost avoided. This contacting is particularly reliable and effective under water and can be released again at any time.

A measuring device for determining the chlorine equivalents of the oxidants present in the water and also a regulating unit, which further processes this measuring signal for the regulation of the power supply means, are provided in the flow direction after the reactor. Thus, a particularly effective automatic operation of the apparatus can take place.

An apparatus of this kind is in particular suitable for carrying out the method of sterilizing water by means of anodic oxidation. The water is led through a reactor having at least one anode and one cathode, with the total electrical current density being capable of being changed through the determination of the concentration of the chlorine equivalents of the oxidants and the comparison of this measure concentration with the desired value, namely the concentration which is necessary to kill off the germs.

BRIEF DESCRIPTION OF THE DRAWINGS

The invention will be explained in more detail in the following by way of an example and with reference to the drawing in which are shown:

In FIG. 1 there is shown a reactor 1 of an apparatus for sterilizing water which has a tubular housing 10 with an inlet flange 11 and also an outlet flange 12 provided at its axial ends.

The housing 10 has four substantially identical housing sections 10', 10", 10''', 10'''', which essentially follow one another over its axial extent. Each of these housing sections is provided at diametrically oppositely disposed locations with a first contact opening 13 and a second contact opening 13' for the anode connection and a first contact opening 14 and also a second contact opening 14' for the cathode connection The contact openings 13, 13', 14, 14' are formed as radially extending tubular sections which penetrate the wall of the housing 10 and are sealingly connected in pressure-tight manner with the wall of the housing 10 at their outer periphery. The first contact opening 13, 14 and the second contact openings 13', 14' are respectively arranged alongside one another in the direction of the axis X of the tubular housing 10.

Figure 1:
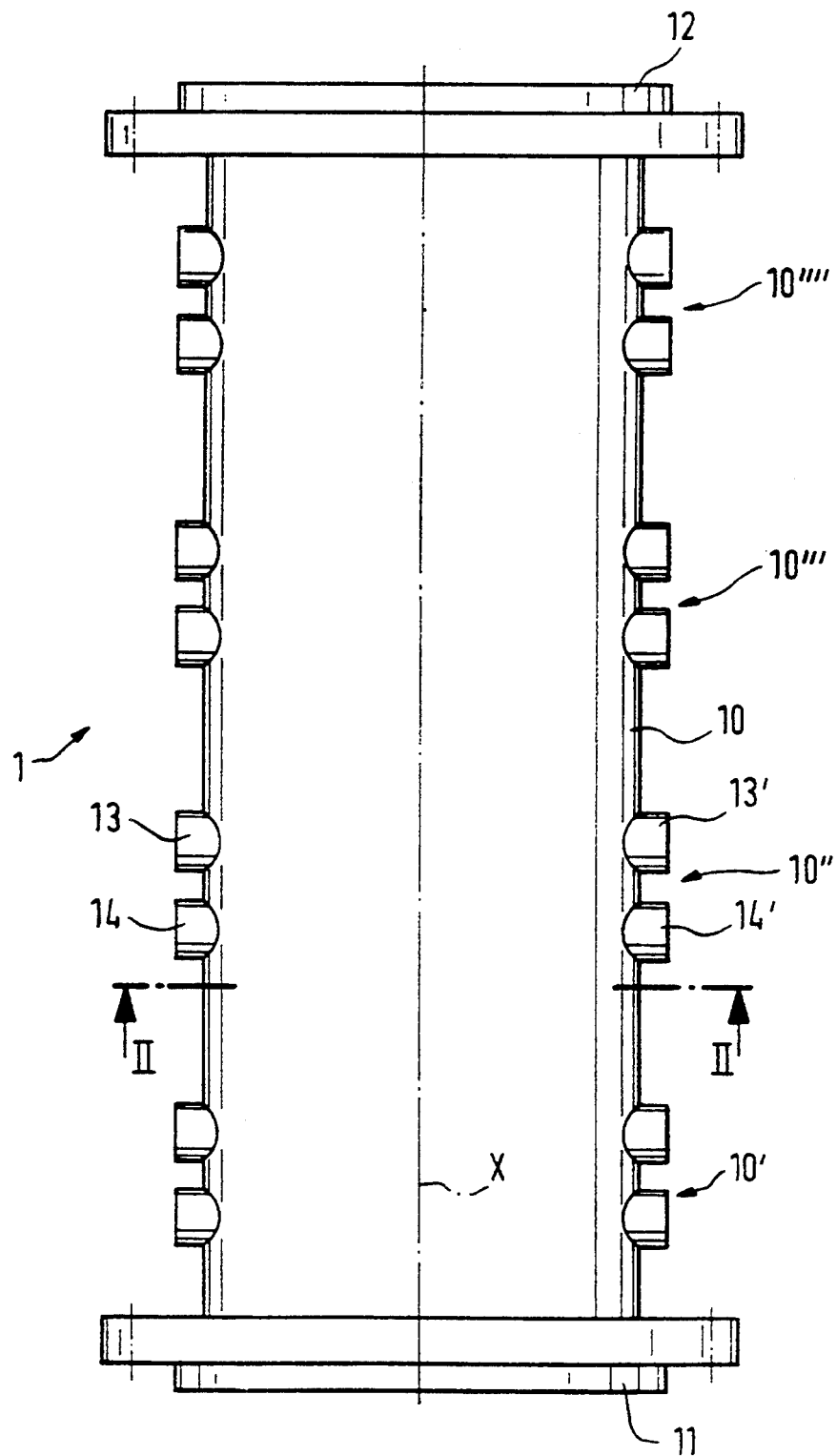
FIG. 1 illustrates a side view of a reactor of the apparatus of the invention.

As each housing section is provided with contact openings 13, 13', 14, 14', a housing 10 has a plurality of mutually diametrically oppositely disposed first and second contact opening pairs corresponding to the number of housing sections, as can be seen in FIG. 1.

Figure 2:
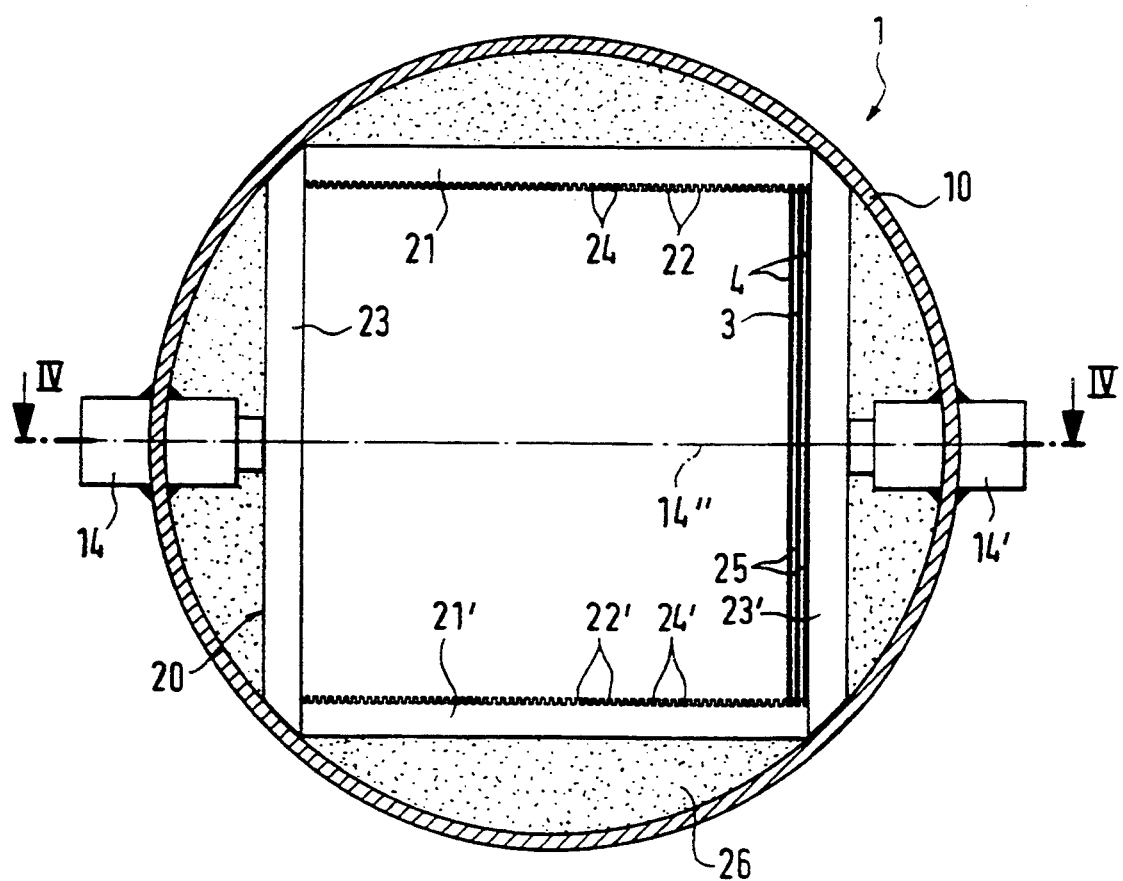
FIG. 2 illustrates a section on the line II—II through the reactor of FIG. 1.

FIG. 2 represents a cross section through a reactor 1 in accordance with the line II—II in FIG. 1. The tubular cross section of the housing 10 with the two radially oppositely disposed first and second contact openings 14, 14' for the cathode connection can be clearly recognized. A square frame 20, inserted into the tubular housing 10, serves to accommodate the electrodes 3, 4 and consists preferably of food quality PVC. The corners of the frame 20 are chamfered off or rounded at the outer sides and the frame 20 is accurately fitted into the housing 10 in such a way that the chamfered or rounded corners contact the inner side of the tubular housing 10. The upper edge and the lower edge of the frame thereby extend parallel to the axis 14" common to the contact openings 14, 14'.

The frame 20 consists of two lateral frame walls 23, 23' which are respectively disposed adjacent the first and second contact opening for the anode connection and the cathode connection 13, 14; 13', 14'. The upper and lower wall of the frame 20 are formed by an upper comb plate 21 and by a lower comb plate 21'. The comb plates 21, 21' are provided at their face confronting the inner side of the frame with grooves 24 arranged alongside one another and extending parallel to the axis X of the housing 10. A web 22, which projects into the inner space of the frame, can be respectively seen between the grooves 24.

The grooves 24 serve for the guidance of plate-like electrodes 3, 4 which are inserted into the frame 20, which extend parallel to the side walls 23, 23' of the frame 20 and the plate size of which amounts preferably to approximately 200 mm×100 mm. Although only three electrodes are drawn in by way of example in FIG. 2, each groove pair 24, 24' serves to guide an electrode, with the cathode 4 and anode 3 alternating and respectively determining a gap 25 between them which has the width of the associated web 22 or 22' (preferably about 1.3 mm,) with the respective thickness of the anode and cathode being about 1 mm. With this electrode arrangement, the number of cathodes is greater by one than that of the anodes so that a cathode contacts each of the side walls 23, 23' without a gap being formed between this outermost cathode and the associated side wall 23, 23'.

The space 26 between the outer side of the frame 20 and the inner side of the tubular housing 10 is sealed off relative to the inner space of the frame and is for example filled with foam. The sealing relative to the inner space of the frame 20 can, for example, take place by circular segment-like covers secured in the region of the inlet flange 11 to the end sides of the frame walls, with the covers which form the opening cross section for the water flowing through the reactor, only leaving free the preferably quadratic inner surface of the frame 20.

Each housing section 10', 10", 10''', 10'''' has an electrode module 2', 2", 2''', 2'''' laid out as previously described and arranged in a frame 20.

Figure 4:
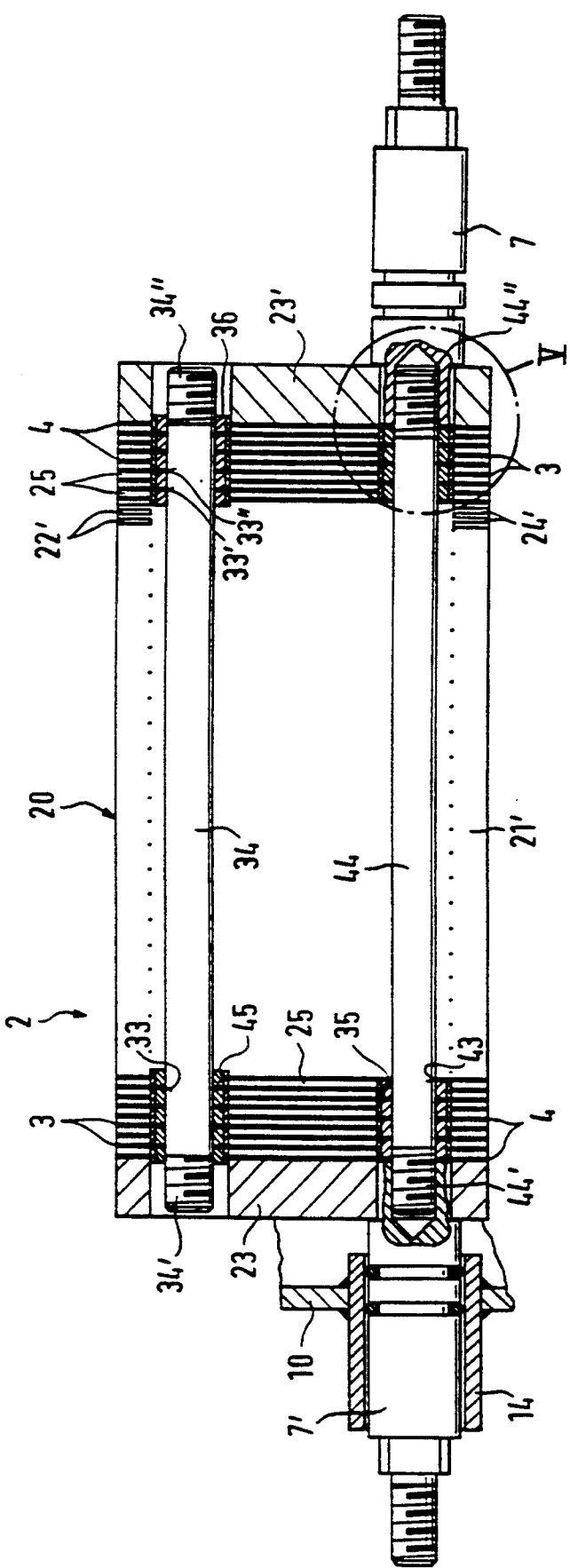
FIG. 4 illustrates a section through an electrode module corresponding to the sectional direction IV—IV in FIG. 2.

A section along the line IV—IV of FIG. 2 is shown by FIG. 4. There, the housing 10 and also one contact opening 14 are shown purely sectionally. FIG. 4 shows the alternating arrangement of anodes 3 and cathodes 4 with the gaps 25 lying between them. Each anode 3 and each cathode 4 has two openings of different diameter which are spaced apart from one another. The smaller opening 33 or 43 is thereby formed for the loose passage of a draw bolt 34 for the anode and a draw bolt 44 for the cathode respectively. The larger opening 45 of the cathode 4 permits the passage of the draw bolt 34 for the anode, with a radial spacing being provided between the draw bolt 34 and the edge of the opening 45. In just the same way the large opening 35 of the anode 3 permits the passage of the draw bolt 44 of the cathode 4 while maintaining a radial spacing. The respective draw bolt 34 or 44 can consist of electrically conductive or non-conductive material.

Figure 5:
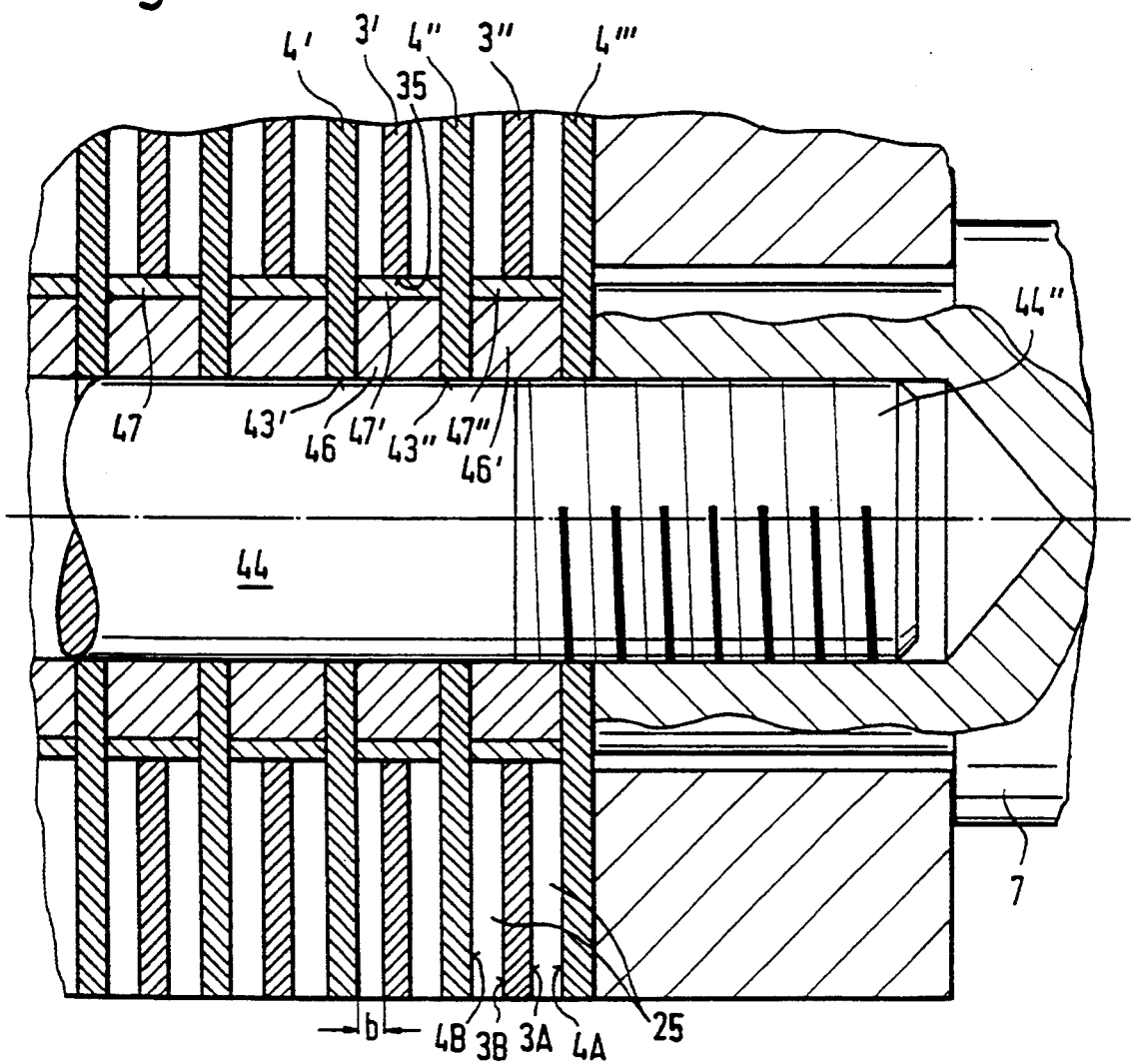
FIG. 5 illustrates a cut-out portion of an electrode module in accordance with V in FIG. 4.

The contacting of the electrodes relative to one another will be explained further in connection with the example of the cathode 4 with reference to FIG. 5. FIG. 5 shows the cut-out portion designated by V in FIG. 4.

The draw bolt 44 passes through the smaller opening 43', 43' of the sequential cathodes 4', 4", with sufficient spacing remaining between the respective opening 43', 43" and the outer periphery of the draw bolt 44, that an axial movement of the draw bolt 44 is possible. Between the sequential cathodes 4', 4", there is provided a conductive spacer ring of a valve metal, preferably of titanium, the end surfaces of which contact the confronting surfaces of sequential cathodes 4', 4". The inner diameter of the spacer ring 46 thereby corresponds essentially to the bores 43', 43", so that the spacer ring 46 also does not hinder an axial movement of the draw bolt 44. Radially outside of the conductive spacer ring 44, there is arranged an insulating intermediate ring 47, the inner periphery of which surrounds the outer periphery of the spacer ring 46. In the axial direction, the insulating intermediate ring 47 is somewhat shorter than a conductive spacer ring, or is resilient, and its end faces contact confronting surfaces of the sequential cathodes 4, 4'. The outer periphery of the insulating intermediate ring 27 thereby contacts the inner periphery of the large opening 35 of the anode 3' disposed between the cathodes 4', 4".

The cathode-side draw bolt 44 is provided at its ends with a respective threaded section 44', 44". The anode-side draw bolt 34 also has threaded portions 34' and 34" at its ends.

Figure 3:
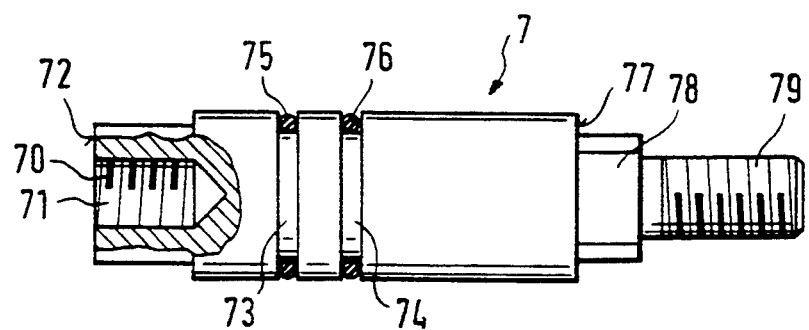
FIG. 3 illustrates a contact bolt, for the reactor of FIG. 1.

The contacting of the cathodes shown in FIG. 5 relative to one another takes place in the following described manner. A contact bolt 7 which is shown in more detail in FIG. 3 is screwed by means of an inner thread 70, which is provided in an axial bore 71, disposed at one end of the contact bolt 70 onto each threaded end 44', 44" of the cathode-side draw bolt 44. At the end of the contact bolt 7 provided with the inner thread 70, the contact bolt has a ring-like end face 72 which enters into contact with the outer surface of the outermost cathode 4'" and presses the latter towards the spacer ring 46' disposed on the other side of this cathode. This then presses in turn against the subsequent cathode 4" which in turn presses against the next spacer ring 46 etc. The contact bolt 7' which is screwed onto the thread 44' lying at the other end of the draw bolt 44 presses in the same manner against the cathode which is placed closest to it.

If now the contact bolts 7, 7' are tensioned relative to one another then a very high surface pressure arises at the respective parting positions between the end face 72 of the draw bolt, the cathode 4'", the spacer ring 46', the cathode 4", the spacer ring 46, the cathode 4' etc., and reduces the respective electrical transition resistance and thus permits the conduction of high electrical currents between the contact bolts and between the cathodes while minimising resistive losses. In this way, resistive polarisation is avoided at the contact surfaces and the associated corrosion is prevented.

The anodes are electrically contacted relative to one another and with the contact bolts associated with them which (not shown) in a similar manner. As, however, a cathode is always disposed first adjacent the side walls 23, 23' of the frame 20, a contact bolt presses in the region of the anode contacting (at the top of FIG. 4) with its ring-like end face 72 initially against the ring-like end face of a conductive spacer ring 36. This in turn presses against the anode 3" adjacent to it etc. The contacting of the electrode module shown in FIG. 2 to the external power supply or to the next module takes place via the cathode contact bolts 7, 7' and also via the anode-side contact bolts, which are not shown in FIG. 4.

The contact bolts 7, 7' are let out of the housing in sealed manner through the associated contact passages 14, 14' for the cathode. In a similar manner, the non-illustrated anode-side contact bolts are led out of the housing through the contact passages 13, 13'.

For sealing purposes, a contact bolt 7 has two axially spaced apart circumferential grooves 73, 74 into which a sealing ring 75, 76 is in each case inserted.

The sealing rings 75, 76 cooperate in a sealing manner with the groove 73 or 74, respectively and with the inner periphery of the contact passage 14, 14'; 13, 13'.

At a remote end from the axial bore 71, the contact bolt 7 is provided with an axial spigot 78 while forming a contact surface 77, with the axial spigot being formed to accommodate a known cable shoe. An axially directed threaded bolt 79 joins the axial spigot 78 and is formed for the screwing on of a suitable nut which presses the non-illustrated cable shoe of a connection cable against the contact surface 77.

Figure 6:
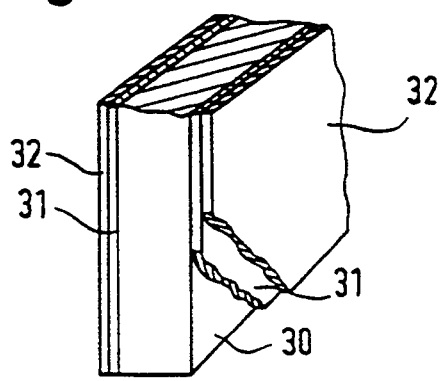
FIG. 6 illustrates an enlarged illustration of the anode assembly.

FIG. 6 shows the build-up of an anode. On an anode core, which preferably consists of a valve metal such as titanium, there is applied a first layer 31 of a suitable conductive material onto which a second layer 32 of another suitable conductive material is applied. A first layer can again be provided on this second layer and a second layer can again follow the first layer etc. One of the two layers 31, 32 consist of a titanium-mixed oxide and the other of the two layer consists of a platinum-iridium alloy. It is not important which of the two layers is first applied to the anode core 30; the important feature is solely that the layers 31, 32 alternate with one another. A coating can be dispensed with in the region of the anode contacting, i.e. in the ring surface surrounding the smaller opening 33 (which is in contact with the spacer rings), which are present in order to improve the electrical conductivity between the anodes and the adjoining spacing rings), so that the spacing rings directly contact the core 30 of the anode formed of valve metal. The cathode preferably comprises (non-rusting) stainless steel, such as V2A-steel.

Contrary to the customary aim in electro-synthesis of reducing the anode overpotential of a particular reaction through high surface roughness, the subject of the application endeavours to keep the overvoltage of the oxygen separation as high as possible relative to the overpotential for chlorine separation through the pre-described choice of the sequentially following anode layers.

Figure 7:
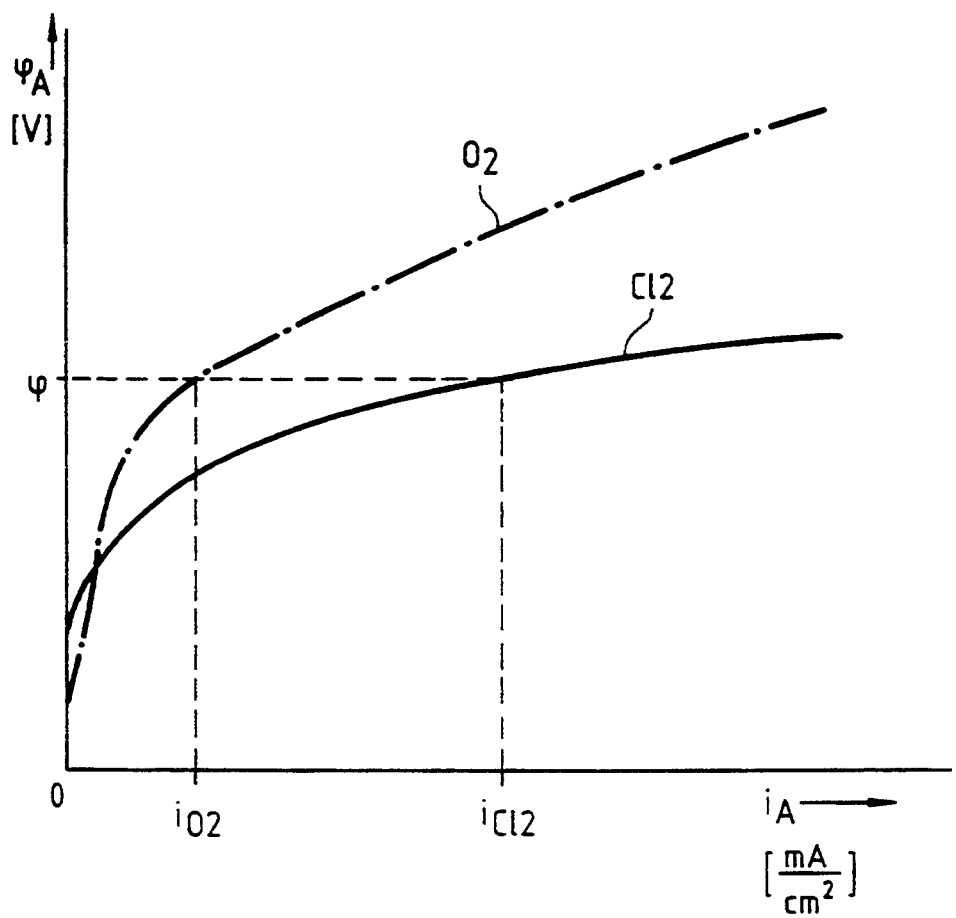
FIG. 7 illustrates the potential behaviour of a preferred anode material, and, FIG. 8 illustrates the schematic assembly of an apparatus of the invention with a regulation provided.

FIG. 7 shows the potential behaviour of the selective anode with the above described construction (shown in broken lines). The anode potential in volts is shown on the ordinate and the current density in mA/cm$^2$ is shown on the abscissa. The continuous curve shows the chlorine generation and the chain-dotted line shows the oxygen generation. In the entire region above the intersection point of the two curves, the oxygen partial flow density $i_{O2}$ is smaller than the chlorine partial flow density $i_{CL2}$. In this way, it is ensured that on the one hand the oxygen generation is reduced to a desirable minimum level even at high current densities, and on the other hand, as a result of the high potential, oxygen compounds with a high oxidation potential (peroxo compounds of also singular oxygen) predominantly arise alongside the OH radical.

Through the predescribed construction of the anode, it is ensured, even with low chlorine concentrations (under 10 mg/l), such as occur in fresh water, that for a relatively low electrical current one can generate an adequate quantity of oxidants for reliable sterilization of the water and these oxidants can be determined as chlorine equivalents.

Figure 8:
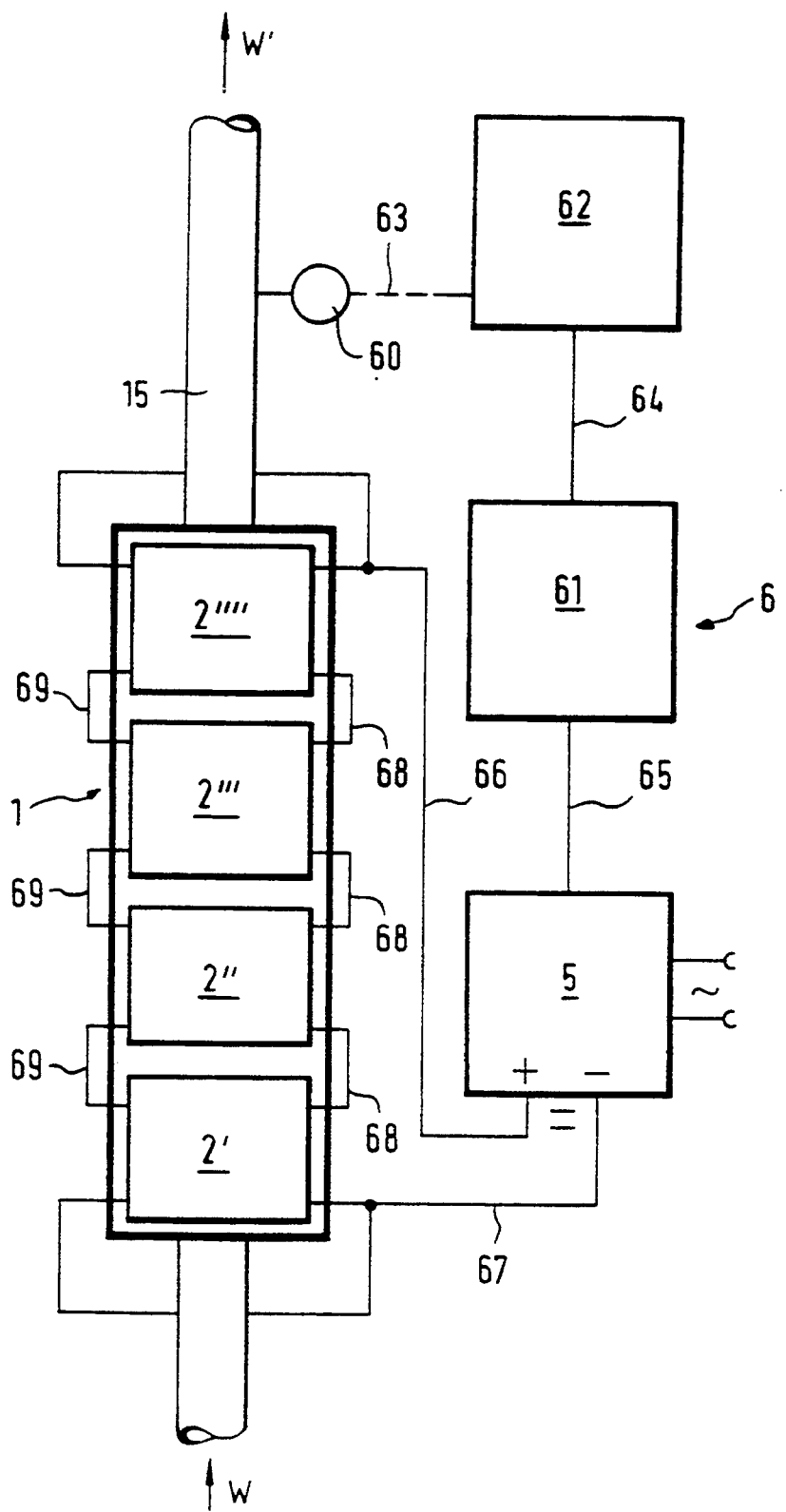

FIG. 8 shows the build-up of a regulated apparatus for the sterilization of water with the reactor 1, through which water flows from below upwardly in the direction of the arrows W, W'. The reactor consists, in accordance with the illustration of FIG. 1, of four electrode modules 2', 2'', 2''', 2'''' which are arranged in series in the flow direction. In this arrangement, the cathode-side of the first electrode module 2' is connected to the negative output pole of a power supply means 5 via a minus supply line 67. For the uniform introduction of current into the electrode module 2' the minus supply line 67 has been branched off, with each branch being connected to one of the contact bolts 7, 7' shown in FIG. 4. The two anode-side contact bolts of the electrode module 2' are connected via bridge line 68, 69 with the cathode-side contact bolts of the electrode modules 2''. In this manner, the electrode modules 2'' and 2''' and also 2''' and 2'''' are electrically connected together. The two branches of a likewise branched positive supply line 66 are connected to the anode-side contact bolts of the last electrode module 2'''' and connect the anodes of the last electrode module 2'''' to the positive connection pole of the power supply means 5.

A measuring device 60 is arranged in the discharge channel 15 disposed downstream of the reactor and the oxidants contained in the water, which can be determined as chlorine equivalents, can be measured. The measuring device 60 is connected via a measurement line 63 with a computing unit 62 via which measurement data is delivered from the measuring device 60 to the computing unit 62.

The computing unit 62 derives from the measurement data that is supplied to it, the concentration of the oxidants contained in the water of the discharge channel which are determined as chlorine equivalents. From this concentration, the computing unit derives the chloride partial current density using data supplied to it by the power supply means 5 which represents the electrical current flowing through the reactor and in the knowledge of the total active electrode surface in the reactor. A value proportional to this chloride partial current density is passed on to a computing unit 61 via a data line 64. In the computing unit 61, this derived value for the partial chloride current density is compared with the corresponding value of a chloride partial current density of a predetermined concentration of free oxidants which can be determined as chlorine equivalents. The difference value resulting from this comparison is converted by the computing unit into a control signal which is supplied via a control line 65 of the power supply means 5.

The power supply means 5 draws its electrical energy from an AC power source indicated by a wavy line. It converts this DC power into a DC current with the DC voltage lying at the DC terminals designated with + and − of the power supply means 5 for the power supply lines 66 and 67 of the reactor 1 being automatically set in accordance with the electrical current flow predetermined by the regulating unit 61. A preferred DC voltage lies in the range from 6 to 7 volts per electric module, so that as result of the series connection of the electric modules in the example of FIG. 8 approximately 24 to 28 volts are present at the outputs of the power supply means 5.

The predescribed regulating circuit makes it possible to set the whole apparatus in accordance with the microbial burden of the water to a predetermined concentration of free oxidants which can be determined as chlorine equivalents. This setting must be carried out on the installation of the apparatus and can be repeated at large time intervals as a check. Changes of the constraints relative to the electric-chemical process which may occur from time to time, such as for example changes of the conductivity of the water or changes of the efficacy of the individual electrode modules, are detected by the measuring and regulating device 6 as a result of the thereby occurring changed concentration of the oxidants in the discharge channel which are determined as chlorine equivalents. Thereupon the electrical current which flows through the reactor is regulated by the regulating means 6 in the sense of a correction of the chloride partial current density.

It has turned out to be advantageous, in particular with respect to the life of the anodes, when the anode comprises a valve metal core with a homogenous electro-catalytically active coating, which is predominantly composed of a compound of titanium and at least one platinum metal in oxidizing and/or non-oxidizing form.

I claim:

1. An apparatus for sterilizing water by anodic oxidation comprising:

a reactor having at least one anode and at least one cathode, the reactor having a gap of constant width between mutually confronting surfaces of the anode and the cathode, the anode comprising a material that has a greater overvoltage with respect to oxygen generation and with respect to chlorine generation;

a power supply means connected to the anode and the cathode in series for supplying an electric current between the anode and the cathode;

a plurality of electrode modules, each electrode module having a plurality of anodes and cathodes alternatively arranged within the module;

anode spacer elements disposed between each anode, the anode spacer elements contacting a contact surface of each anode to electrically connect the anodes to each other;

cathode spacer elements disposed between each cathode, the cathode spacer elements contacting a contact surface of each cathode to electrically connect the cathodes to each other; and means for pressing the anode and cathode spacer elements together under high pressure to generate a high specific surface pressure at the contact surfaces of the anodes and the cathodes.

2. The apparatus of claim 1 wherein the pressing means comprises:

a cathode draw bolt disposed through a first coaxial connection bore in each cathode and anode, the cathode draw bolt extending through the module and having a threaded portion on either side of the module, the cathode spacer elements being annular rings disposed around the cathode draw bolt between the anodes and the cathode draw bolt;

an anode draw bolt disposed through a second coaxial connection bore in each cathode and anode, the anode draw bolt extending through the module and having a threaded portion on either side of the module, the anode spacer elements being annular rings disposed around the anode draw bolt between the cathodes and the anode draw bolt; and contact bolts threadably engaged to the threaded portions of the anode and cathode draw bolts, the contact bolts being adapted to apply a tensile stress to the draw bolts thereby pressing the anode and cathode spacer elements together on either side of the module.

3. The apparatus of claim 2 further comprising:

a plurality of first annular spacer rings disposed around the cathode draw bolt, each first annular spacer ring separating an anode from the cathode spacer elements so that the anodes are insulated from the cathode spacer elements and the cathodes; and a plurality of second annular spacer rings disposed around the anode draw bolt, each second annular spacer ring separating a cathode from the anode spacer elements so that the cathodes are insulated from the annular spacer elements and the anodes.

* * * * *